United States Patent [19]
Maeda

[11] Patent Number: 5,457,543
[45] Date of Patent: Oct. 10, 1995

[54] METHOD OF CONTROLLING AN OUTPUT ORDER OF COPY IMAGES

[75] Inventor: Hiroshi Maeda, Kashihara, Japan

[73] Assignee: Sharp Kabushiki Kaisha, Osaka, Japan

[21] Appl. No.: 237,344

[22] Filed: May 3, 1994

[30] Foreign Application Priority Data

May 7, 1993 [JP] Japan .................................... 5-106684

[51] Int. Cl.$^6$ ............................ H04N 1/23; H04N 1/387; H04N 1/393
[52] U.S. Cl. .......................... 358/401; 358/450; 358/451; 358/468
[58] Field of Search ..................... 358/450, 451, 358/448, 468, 401, 296, 300, 444; 355/24, 25, 319

[56] References Cited

U.S. PATENT DOCUMENTS

| | | | |
|---|---|---|---|
| 4,334,765 | 6/1982 | Clark | 355/24 |
| 4,342,052 | 7/1982 | Rackley et al. | 358/450 |
| 4,588,291 | 5/1986 | Lulay et al. . | |
| 5,051,843 | 9/1991 | Hayashi | 358/450 |
| 5,105,283 | 4/1992 | Forest et al. | 358/450 |

FOREIGN PATENT DOCUMENTS 61-265965  11/1986  Japan .

Primary Examiner—Scott A. Rogers
Attorney, Agent, or Firm—David G. Conlin; Kevin J. Fournier

[57] ABSTRACT

The present invention relates to a method of controlling an output order for copy images, comprises the steps of, reading respective images of a plurality of manuscripts to be copied, storing respective image data relating to the read respective images, scaling down respective image data relating the read respective images and printing on a sheet a multi-shot image data including a plurality of the scaled down imager reading other images described on the printed sheet, the other images defining an output order, and printing the respective imager on the other sheets in an order specified by the read other images.

4 Claims, 11 Drawing Sheets

Fig. 6
Fig. 7
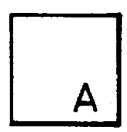 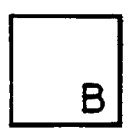 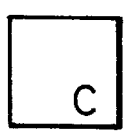 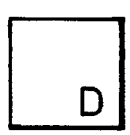
1      2      3      4   · · · OUTPUT ORDER

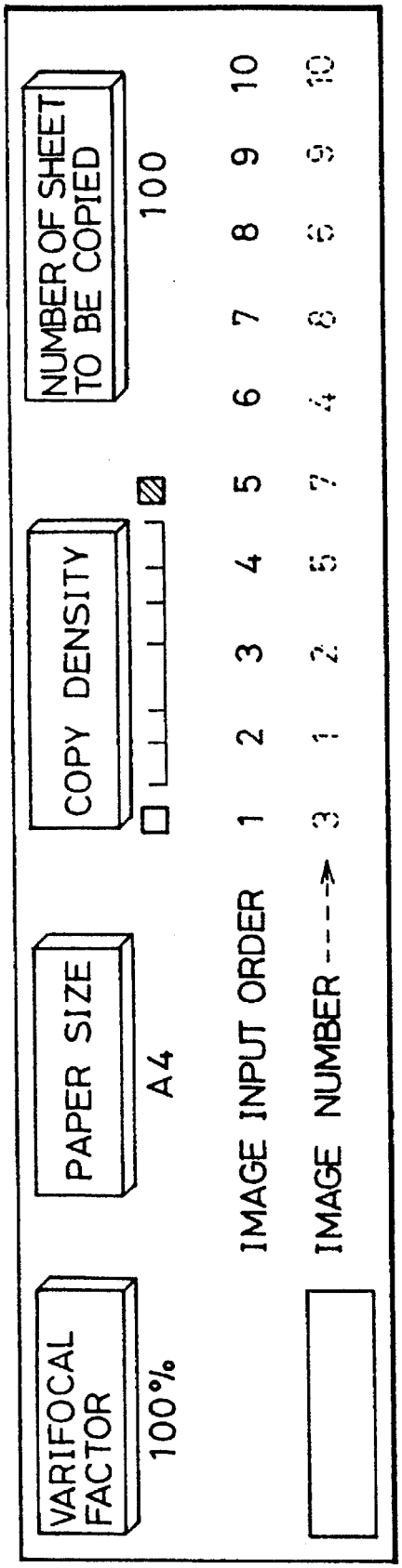

METHOD OF CONTROLLING AN OUTPUT ORDER OF COPY IMAGES

BACKGROUND OF THE INVENTION

1. Field of the Invention

The present invention relates to a method of controlling an output order of copy images, and more particularly to a method of controlling an output order of copy images, in which the output order of the copy images can be controlled regardless of an input order of manuscripts to be copied.

2. Description of the Related Art

A prior art will be described with reference to the attached figures.

FIG. 12 shows a flow chart illustrating an output process for an image in a prior image processing device. FIG. 13 illustrates a method of managing the image in an image storage device in the prior image processing device. FIG. 14 shows an operation panel in the prior image processing device.

Conventionally, in relation to a copy order for the copy image, (1) a number is annexed to the manuscript at a time of an input, and the output order of the copy is changed by specifying the number in which an output is desired, and the copy image is outputted. Otherwise, (2) at the time of the input, the output order of the copy is changed and inputted in the order in which the output is desired. In detail, in FIG. 12, the number is annexed to each manuscript (12-1) which is inputted from an image reader, and the output order is managed in the image storage device. That is, data is managed in an address of a memory which can store and accumulate the image. For example, the addresses from 000000H to 800000H are set to a No. 1 image (refer to FIG. 13).

In order to output, based on a required order, an input manuscript managed as in care (1) described above, where a user memorizes the output order for the image (12-2), the order for outputting the input manuscript from the operation panel (refer to FIG. 14) controlling an output function is specified (12-4). And then the image which is copied on a copy paper is outputted, based on the specified order (12-5). In a case where the user does not memorize the output order for the image, the output order is again specified from the operation panel, after the user checks the output order for the manuscript or outputs all the images (12-3).

In case (2) mentioned above, the input order is previously agreed on with the output order specified by the user. Therefore, the device is not especially concerned about the order.

As a defect of the prior art, in a case where the manuscript input from an input system is checked, it is impossible to check the manuscript unless the manuscript is output from an output system (i.e. a printer) one time. Therefore, it is necessary to output all manuscript imager.

Further in the prior art, the manuscript input at random is output in the order required by the user. Therefore, after all the input manuscript imager are output from the output system and checked, again, the output order is set and output. Thereby, it is impossible to check the image which is desired to be output and to specify the output order simultaneously.

SUMMARY OF THE INVENTION

It is therefore an object of the present invention to provide a method of controlling an output order for a copy image in which there is no need of changing an order of a manuscript in view of the output order in relation to an image of a copied manuscript and in which the copy image can be output in a specified order even if the manuscripts are input at random.

The object of the invention can be achieved by a method of controlling an output order for copy images, comprising the steps of: reading respective images of a plurality of manuscripts to be copied; storing respective image data relating to said read respective images; scaling down respective image data relating to the read respective images and printing on a sheet a multi-shot image including a plurality of the scaled down imager; reading other images described on said printed sheet, said another images defining an output order; and printing said respective imager on other sheets in an order specified by read other images.

According to the above mentioned features, respective images of a plurality of manuscripts to be copied are read, respective image data relating to the read respective images is stored, respective image data relating to the read respective images is scaled down and a multi-shot image including a plurality of the scaled down imager is printed on a sheet. Other images described on the printed sheet, defining an output order, are read, and said respective imager are printed on other sheets in an order specified by the read other images. Thereby, it is possible to easily and exactly output the respective imager in relation to the manuscript in any order specified by an operator who operates the image processing device.

Further objects and advantages of the present invention will be apparent from the following description of the preferred embodiments of the invention as illustrated in the accompanying drawings.

BRIEF DESCRIPTION OF THE DRAWINGS

FIG. 6 is a view illustrating a multi shot image in which the desired output order for a copy image is recorded;

FIG. 7 is a view illustrating an outputted copy image;

FIG. 14 is a view illustrating an operation panel of the prior image processing device.

DESCRIPTION OF THE PREFERRED EMBODIMENTS

One embodiment of an output order control method according to the present invention will be described in detail hereinafter with reference to the accompanied drawings from FIGS. 1 to 7.

Figure 1:
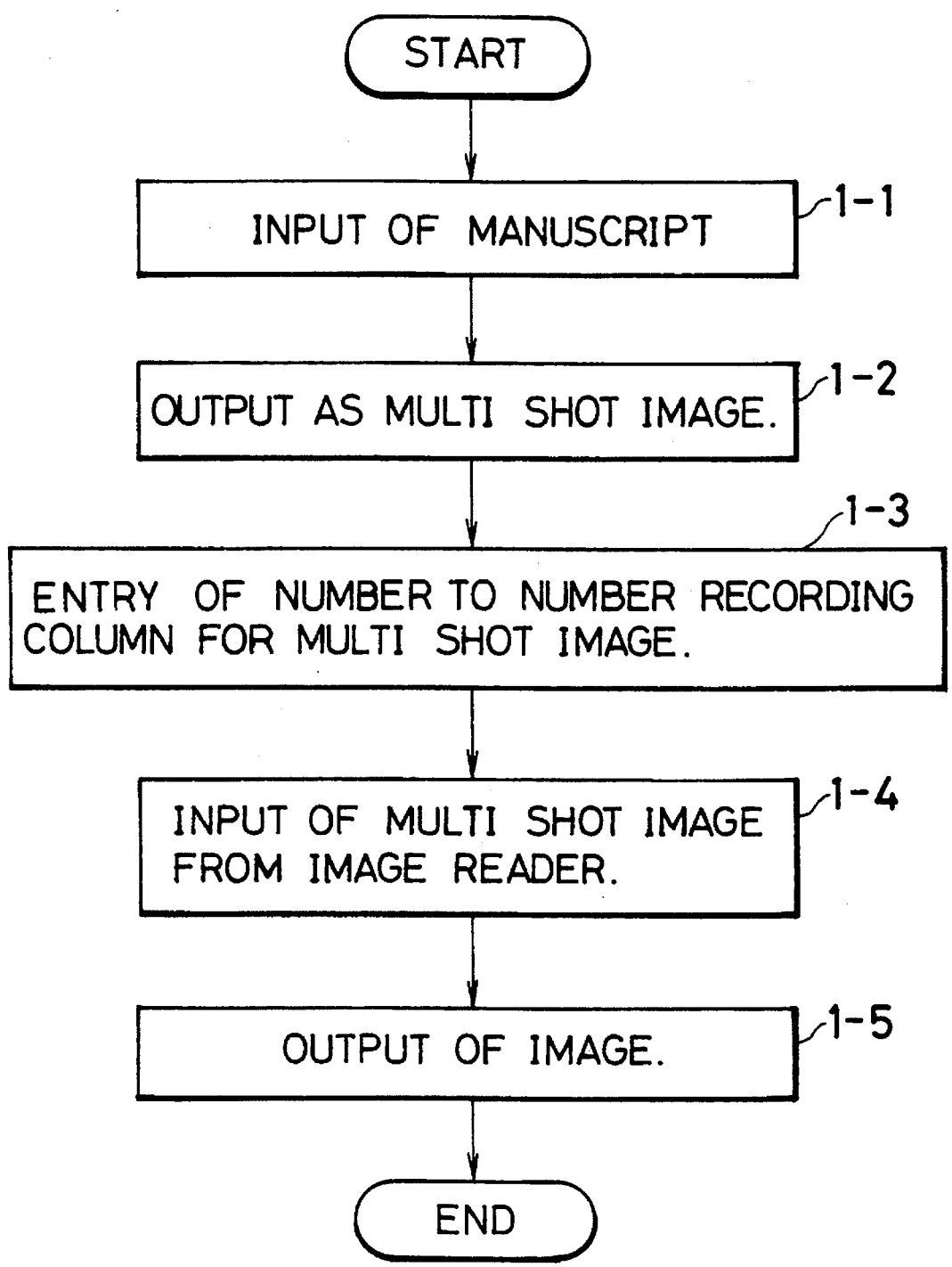
FIG. 1 is a flow chart illustrating one embodiment of an output order control method according to the present invention.
Figure 2:
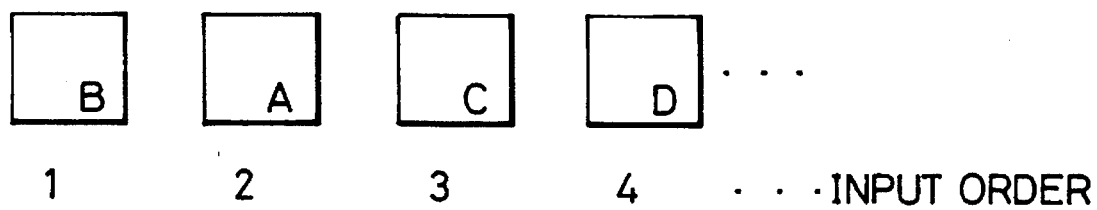
FIG. 2 is a view illustrating an input order for manuscripts.

In FIG. 1, images to be copied from manuscripts, for example, a book, a report, a magazine and the like are regardless of an output order, inputted to an image reader for reading the manuscript (1-1). For example, the images are inputted in an order of the manuscripts B, A, C and D illustrated in FIG. 2.

An image, data of the inputted manuscripts is processed in a memorizable manner. Then, such a processed image data is stored in a storage device. After that, a multi shot image in relation to the inputted manuscripts (refer to FIG. 8) is outputted by means of a printer (1-2).

Figure 3:
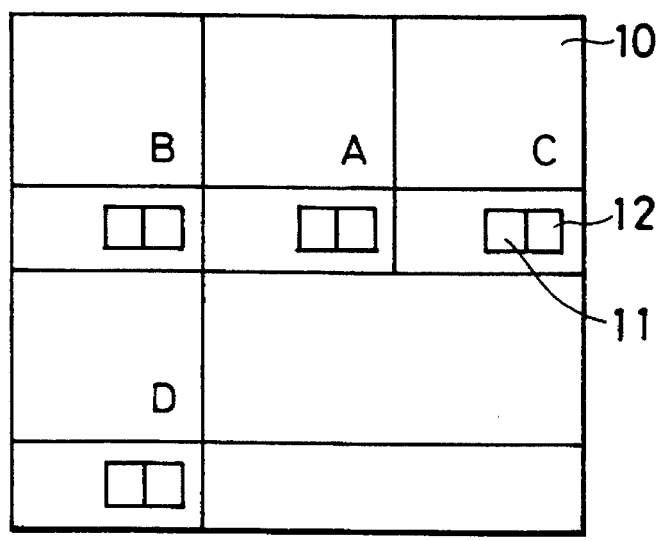
FIG. 3 is a view illustrating a multi shot image.
Figure 4:
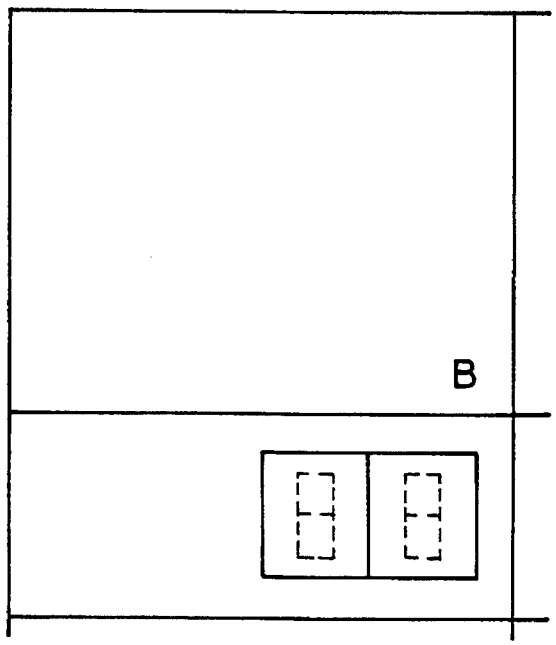
FIG. 4 is a partially enlarged view of the multi shot image.
Figure 5:
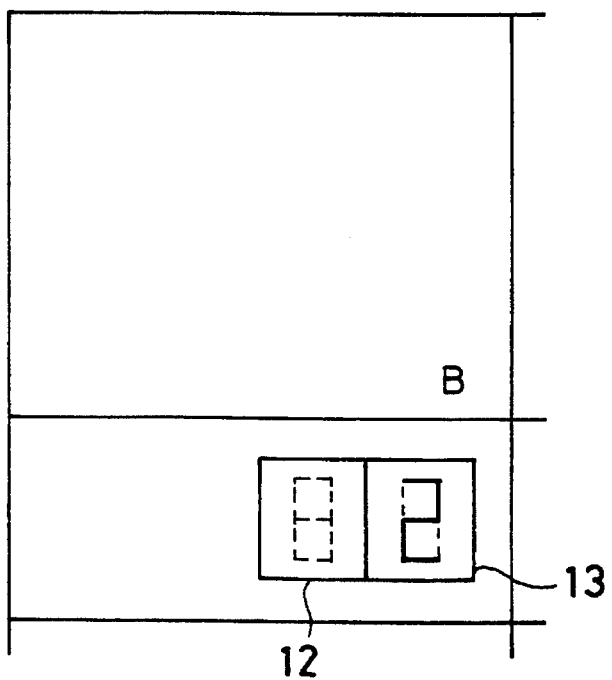
FIG. 5 is a partially enlarged view of the multi shot image in which a desired output requirement order for a copy image is recorded.

The multi shot image is printed, as shown in FIG. 3. In FIG. 3, reference numeral 10 denotes the image in which the inputted manuscript is scaled down, 11 is a first area of a number recording column in which the tens digits of the output order is filled up, and 12 is a second area of the number recording column in which the units digits of the output order is filled up. An operator of a copier fills up a desired output order for the printed multi shot image, in the first area 11 or the second area 12 of the number recording column with a number (1-3). Refer to FIGS. 4, 5 and 6. In this case, the desired output order is A, B, C and D.

The numbers indicating the desired output order are recognized by inputting to the image reader the multi shot image in which the numbers are filled up (1-4). Refer to FIG. 6.

The image is outputted in the order of a recognized number, as shown in FIG. 7.

Figure 8:
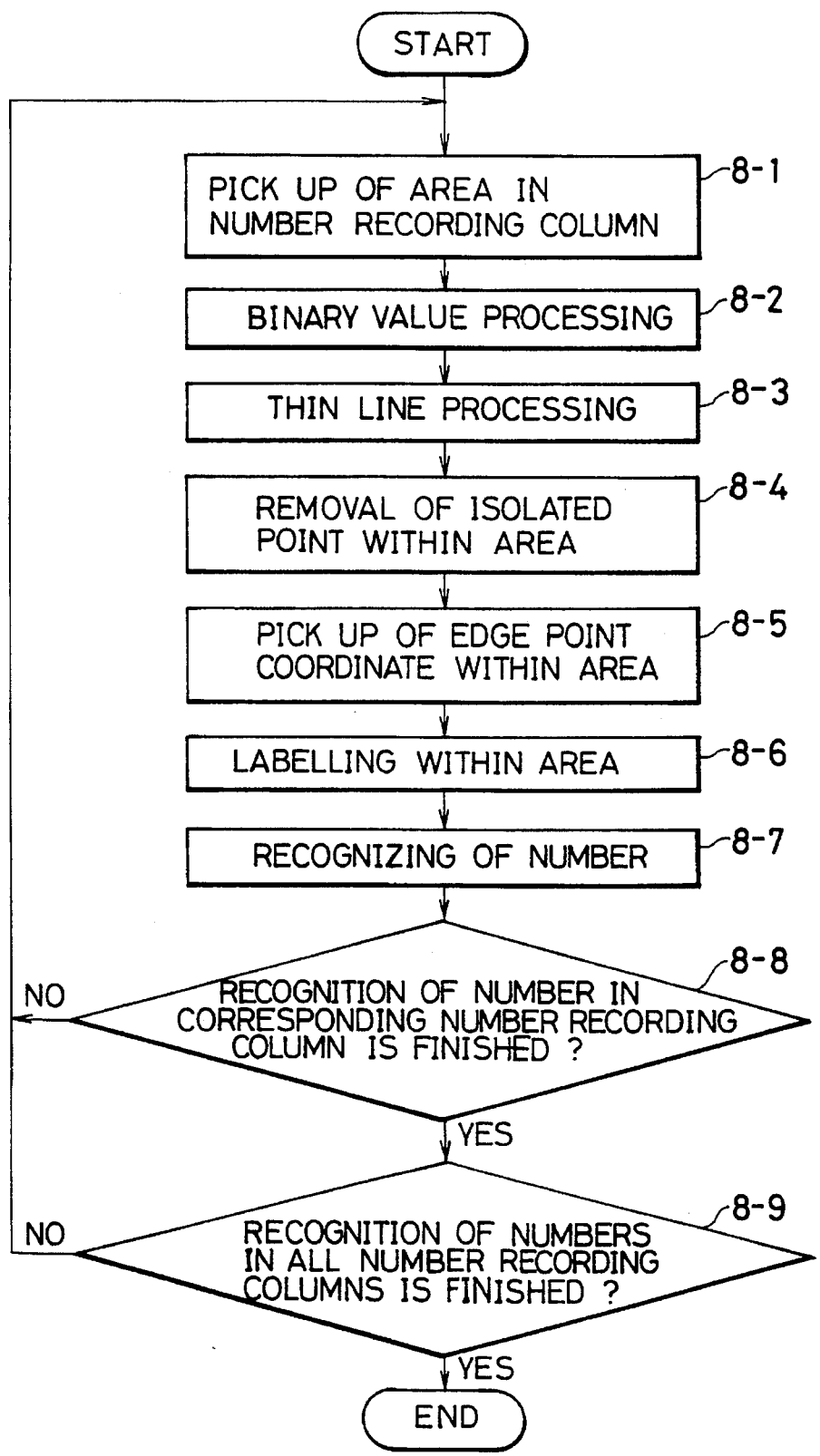
FIG. 8 is a flow chart illustrating a method of recognizing the number.
Figure 9:
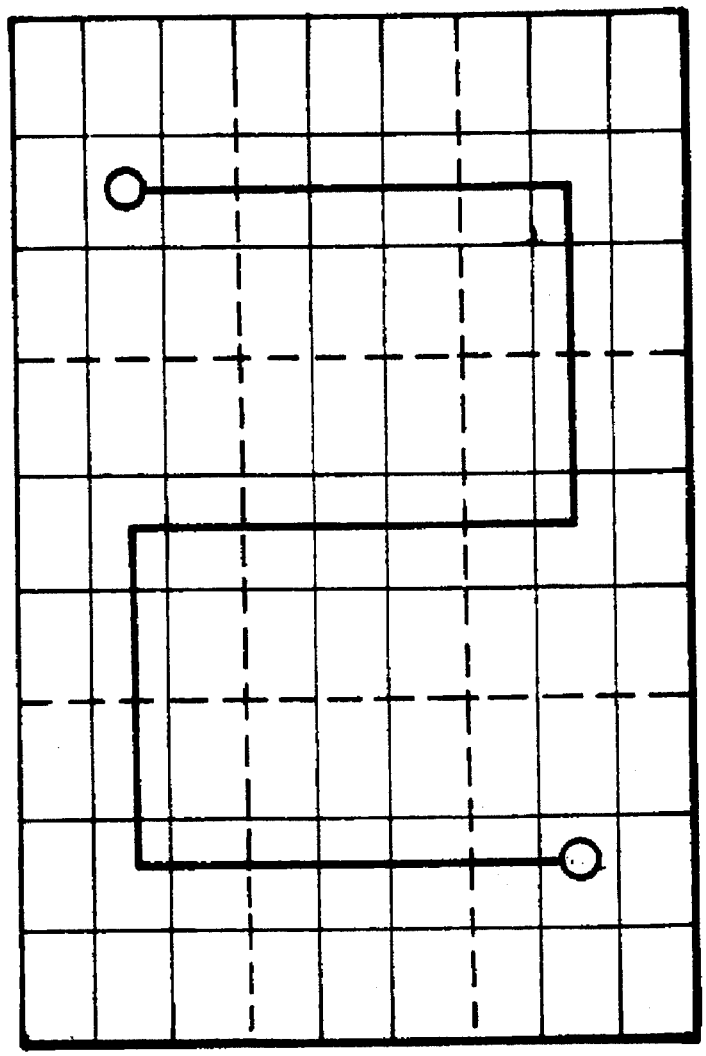
FIG. 9 is an enlarged view for a number recording column.

FIG. 8 is a flow chart illustrating a method of recognizing the numbers. FIG. 9 is an enlarged view of an area of the number recording column.

In FIG. 8, the number recorded on the multi shot image as mentioned above is recognized as mentioned below. As shown from FIGS. 3 to 6, the number recording column is located in a predetermined position of the multi shot image. The position is picked up as the area. Then, the number is recognized. The area of the number recording column is picked up (8-1).

A binary value processing (8-2), and a thin line processing (8-8) are performed for the area which is picked up. After that, an isolated point in the area is removed (8-4), and then only the recorded number is taken out.

The thin line processing will be described in detail hereinafter.

The thin line processing means a process in which a connecting component in relation to the binary valued image data is converted into a line figure corresponding to its core line.

1. One area of the number filling up column is subdivided into three rows in a main direction and into three rows in a sub direction. Thereby, the area of the number filling up column is subdivided into total nine sub area of cordinates (1, 1), (1, 2), . . . , . . . (3, 2), (3, 3).

2. These respective sub areas each is scanned in 3×8 matrix processing pattern, thereby to be processed into binary values. The others except predetermined pattern which can recognize the number are removed.

3. A centerd small area of each of sub areas is defined as a remarked pixcel. The remarked pixcel is regaraded as the isolated point and removed when the remarked pixcel is 1 and eight small areas around the remarked pixcel are 0 respectively.

4. In a ase where the connction pattern of the remarked pixcel is in the following four patterns, the remarked pixcel is regarded as the end point of the image data.

And, a labelling is carried out for the image filled up with the number is the number of the closed area is counted (8-6).

A removal of the isolated point is performed in such a manner that the image is scanned in a processing pattern of 3×3 and that when a connecting numeral of a remarked pixel is 0, the remarked pixel is regarded as the isolated point and removed.

Then, in relation to the image having only the recorded number, the image at an edge point is picked up, that is, the image is scanned in the processing pattern of 3×3, and the end point is picked up from a connecting pattern of the remarked pixel (8-5).

| 0 | 1 | 0 | | 0 | 0 | 0 | | 0 | 0 | 0 | | 0 | 0 | 0 |
|---|---|---|---|---|---|---|---|---|---|---|---|---|---|---|
| 0 | 1 | 0 | | 1 | 1 | 0 | | 0 | 1 | 0 | | 0 | 1 | 1 |
| 0 | 0 | 0 | | 0 | 0 | 0 | | 0 | 1 | 0 | | 0 | 0 | 0 |

And, for the image having only the recorded number, a labeling is performed, and the numeral of a closed area is counted (8-6).

The labeling means that different labels are assigned respectively to respective connecting components in a binary value image. In detail, the pixel to which the label is not assigned is searched by scanning the binary value image. An unused label is assigned to the image. Then, the same label is assigned to the eight adjacent pixels (having the same value as the remarked pixel). Further, the label is assigned to the eight adjacent same values.

The number is recognized from the numeral of the closed area of the labeling and the end point mentioned above (8-7). A relation between the data and the number utilizes a characteristics shown in a table 1.

TABLE 1

| NUMBER | NUMERAL OF END POINT | COORDINATE AT END POINT | | | | | | LABEL NUMERAL |
|---|---|---|---|---|---|---|---|---|
| 1 | 2 | 3 | 1 | 3 | 3 | | | 2 |
| 2 | 2 | 1 | 1 | 3 | 3 | | | 2 |
| 3 | 3 | 1 | 1 | 1 | 2 | 1 | 3 | 2 |
| 4 | 3 | 1 | 1 | 3 | 1 | 3 | 3 | 2 |
| 5 | 2 | 3 | 1 | 1 | 3 | | | 2 |
| 6 | 1 | 3 | 1 | | | | | 3 |
| 7 | 2 | 1 | 2 | 3 | 3 | | | 2 |
| 8 | 0 | | | | | | | 4 |
| 9 | 1 | 3 | 3 | | | | | 3 |
| 0 | 0 | | | | | | | 3 |

The number (the number indicating the output order) is defined based on the table 1. Incidentally, the coordinate in the number recording column is actually shown in FIG. 9. In FIG. 9, a rounded mark means the end point. The number is recognized for the first area and the second area in a corresponding number recording column (8-8).

Furthermore, this process is performed until the number is recognized in all the number recording columns (8-9).

Figure 10:
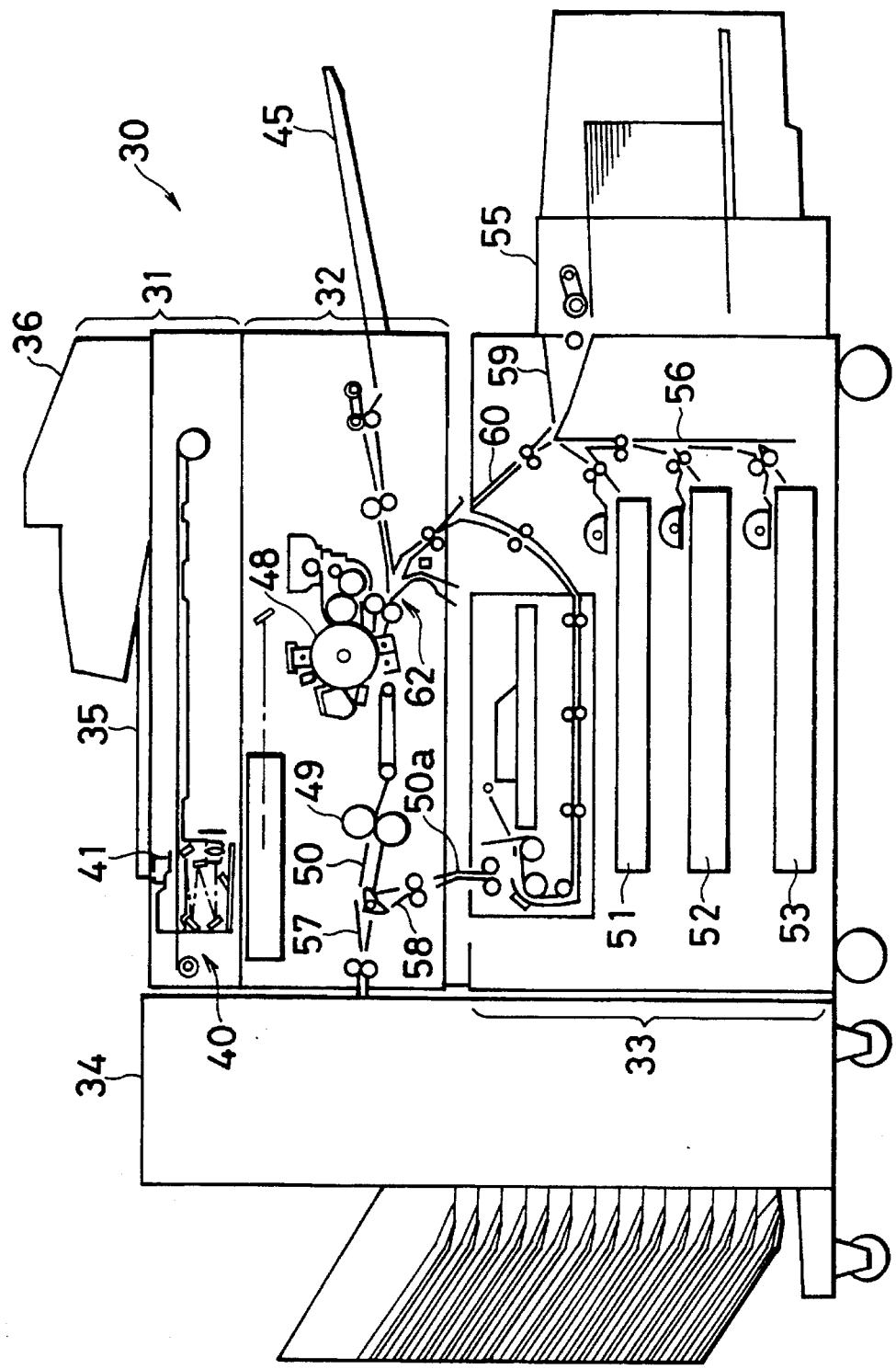
FIG. 10 is a schematic sectional view illustrating a construction of an image processing device.
Figure 11:
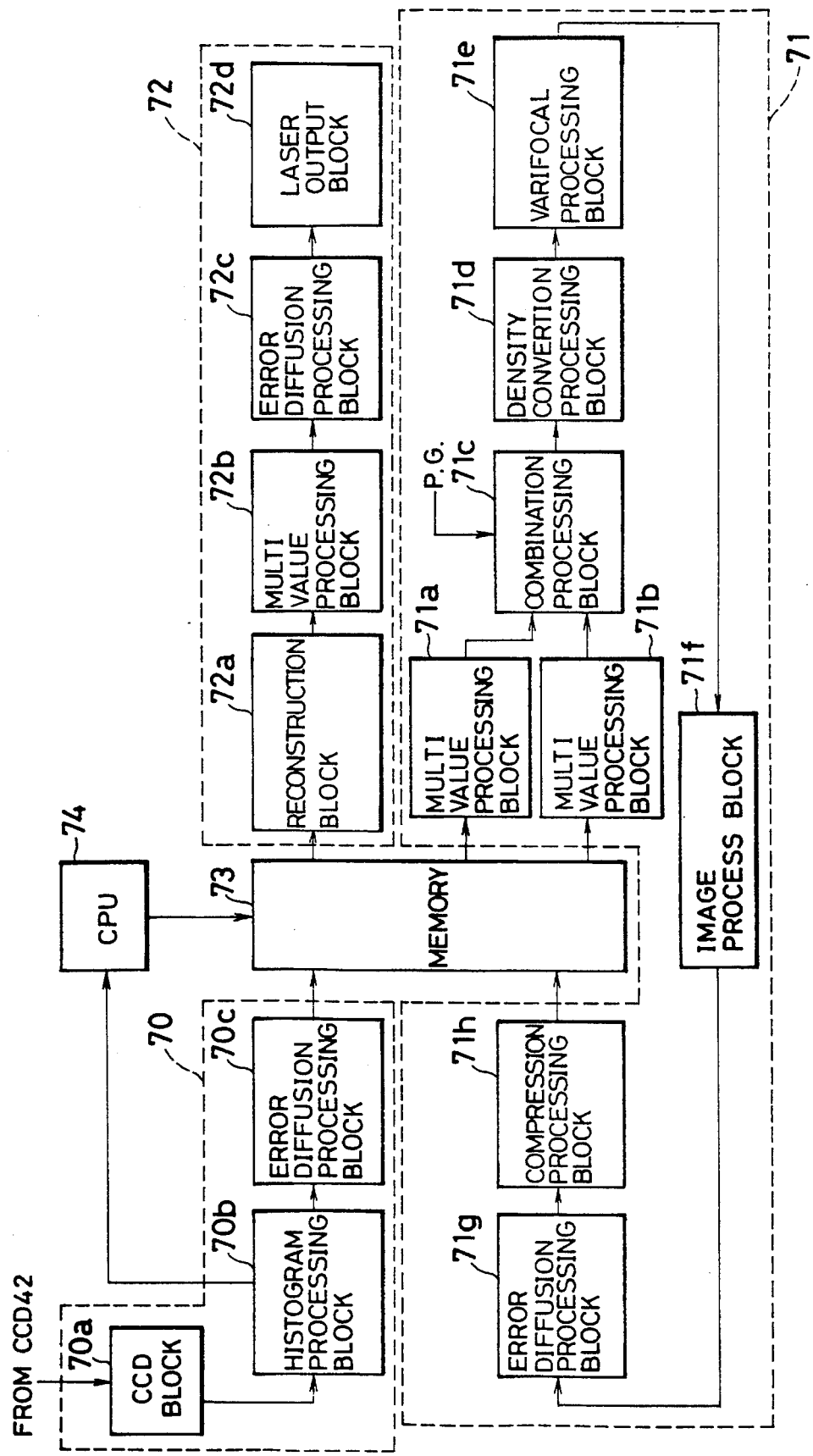
FIG. 11 is a block diagram for a control circuit used in one embodiment of the output order control method according to the present invention.
Figure 12:
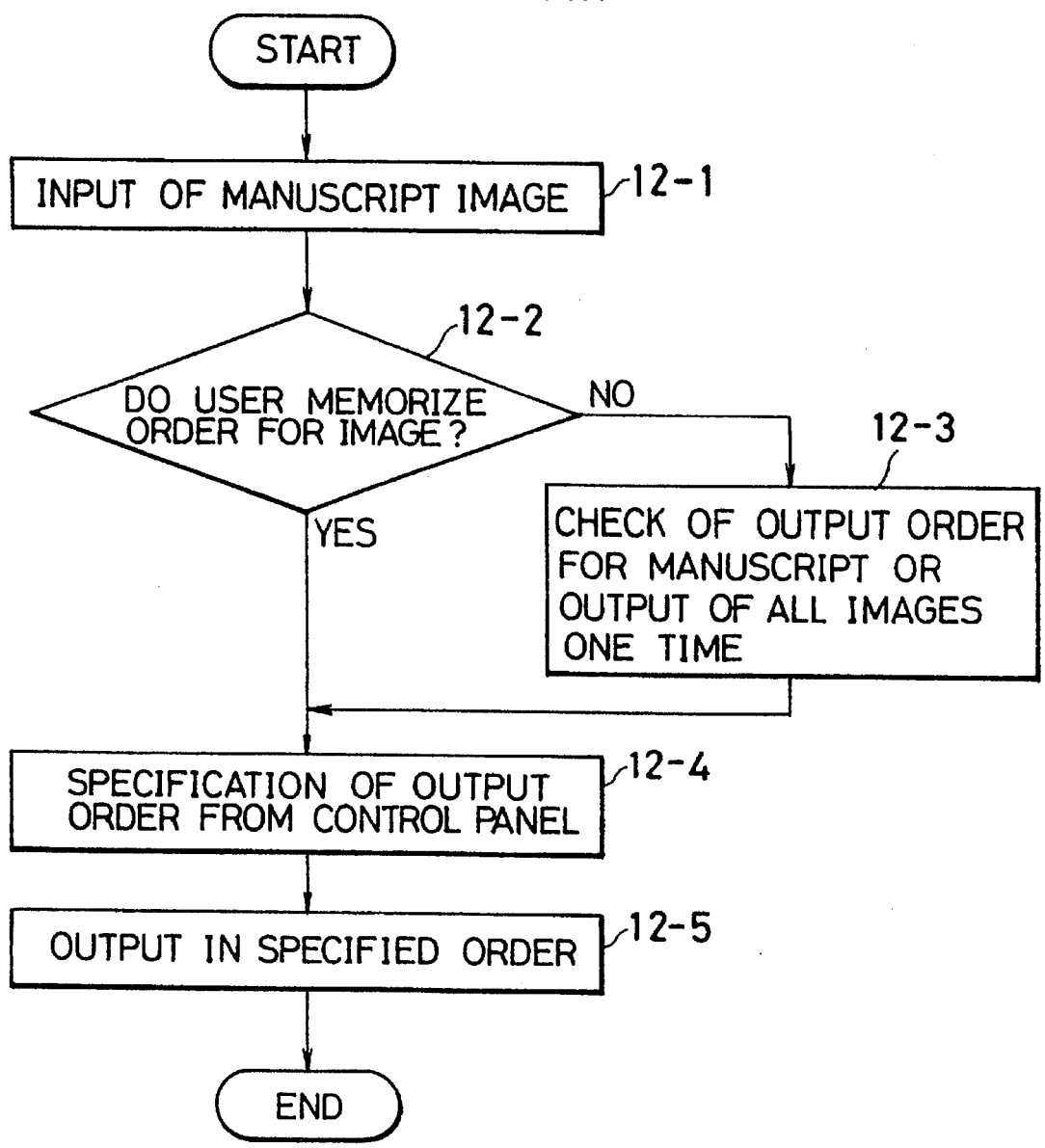
FIG. 12 is a view illustrating an output order for an image in a prior image processing device.
Figure 13:
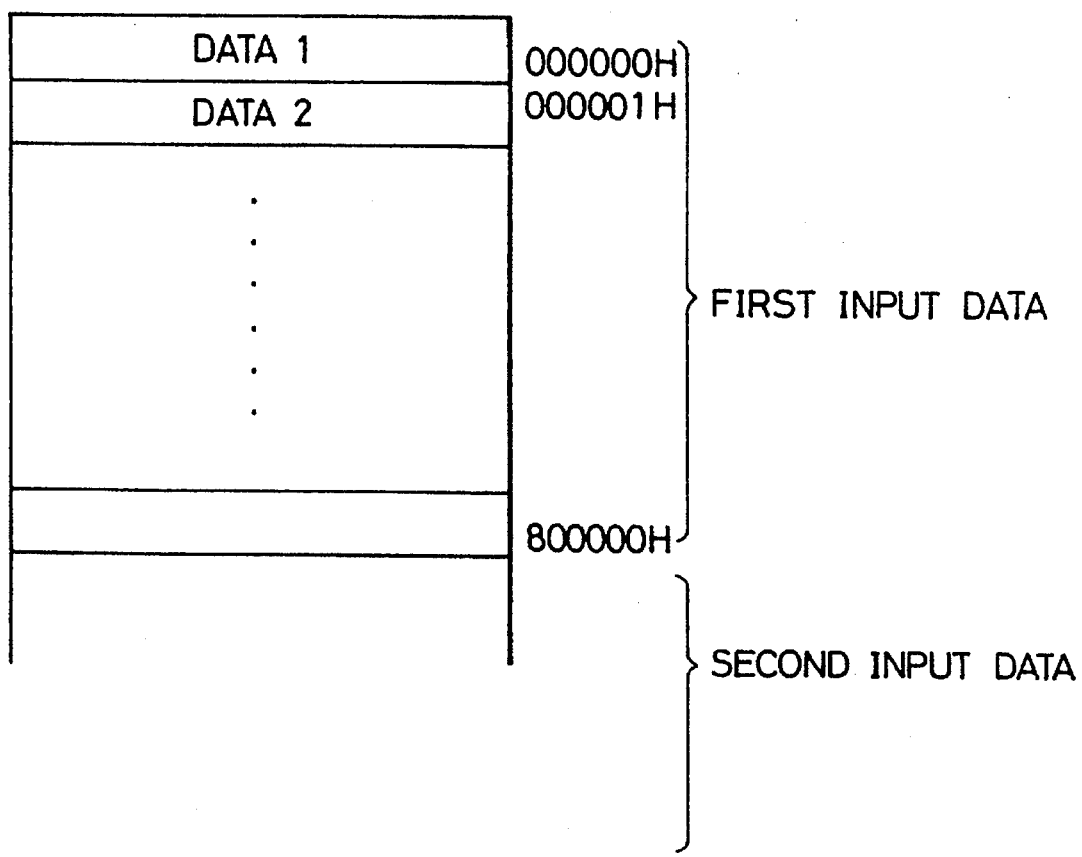
FIG. 13 is a view illustrating a method of managing an output order in the image storage device in the prior image processing device.

After all of the recognitions of the numbers have been finished, the image data is called sequentially in a checked number order from the storage device (FIG. 1, 1-5). FIG. 10 is a schematic sectional view illustrating a construction of an image processing device. FIG. 11 is a block diagram for a control circuit used in the embodiment of the output order control method according to the present invention.

In FIG. 10, reference numeral 30 denotes an image processing device, 31 is a scanner portion, 32 is a laser printer portion, 33 is a multi stages sheet feeder unit, 34 is a sorter, 48 is a photosensitive body, and 49 to 60 is a paper feeding system.

The scanner portion 31 is adapted in such a manner that a scanner unit 40 reads a manuscript image while moving along a bottom surface of a manuscript base 35, in a case where the scanner unit 40 scans the manuscript placed on the manuscript base 35 is scanned. Furthermore, the scanner portion 31 is also adapted to read the manuscript image while sending the manuscript in a state that the scanner unit 40 is stopped in a predetermined position under an automatic manuscript feeder In FIG. 11, reference numeral 70 denotes an image data input portion, 71 is an image processing portion, 72 is an image data output portion, 73 is a memory, and 74 is a central processing unit (CPU).

The method of controlling the output order of the copy image mentioned above is performed by using the image processing device 30 which is controlled in a control circuit shown in FIG. 11.

The image processing device 30 comprises the control circuit as shown in FIG. 11. The control circuit comprises an image data input portion 70 to which an image data is inputted, an image processing portion 71 in which the defined process is performed for the inputted image data, an image data output portion 72 which outputs the image data, the memory 73 in which the inputted image data and the like are stored and a central processing unit CPU 74 which controls each respective portions.

The image data input portion 70 comprises a CCD portion 70a receiving a signal from a CCD 42 in the scanner unit 40, a histogram processing portion 70b performing a histogram processing for an output of the CCD portion 70a, and an error diffusion processing portion 70c performing an error diffusion processing for the output from the histogram processing portion 70b.

The image processing portion 71 comprises a multi value processing portions 71a and 71b reading the image data stored in the memory 73 and performing the multi value processing for it, a combination processing portion 71 c combining the outputs from the multi value processing portions 71a and 71b, a density conversion processing portion 71d converting a density of the image data outputted from the combination processing portion 71c into a desired density, a varifocal processing portion 71e setting a multiplying factor of the image data outputted from the density conversion processing portion 71d into a desired multiplying factor, an image processing portion 71f if generating the image varifocussed based on the output from the varifocal processing portion 71e, an error diffusion processing portion 71g performing an error diffusion processing for the image generated in the image processing portion 71f, and a compression processing portion 71h compressing the data outputted from the error diffusion processing portion 71g and storing it into the memory 73.

The image data output portion 72 comprises a reconstruction portion 72a reconstructing a compressed image data into an original state, a multi value processing portion 72b performing the multi value processing for the image data recovered in the reconstruction portion 72a, an error diffusion processing portion 72c performing the error diffusion processing for the output from the multi value processing portion 72b, and a laser output portion 72d converting the image data, for which the error diffusion processing is performed, into a laser beam and outputs it.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling an output order for copy images, comprising the steps of:

reading respective images of a plurality of manuscripts to be copied;

storing respective image data relating to said read respective images;

scaling down respective image data relating said read respective images and printing on a sheet a multi-shot image including a plurality of the scaled down imager;

reading other images described on said printed sheet, said other images defining an output order; and printing said respective imager from the stored image data on the other sheets in an order specified by said read other images.

2. A method according to claim 1, wherein said other images comprise numbers respectively.

3. A method according to claim 2, wherein said step of printing comprises a step of printing columns for filling in with number at predetermined portions on said sheet.

4. A method according to claim 3, wherein said columns comprise a first area defining a single digit integer multiple of ten, and a second area defining a single digit integer multiple of one.

* * * * *